United States Patent [19]
Hamar

[11] Patent Number: 6,038,050
[45] Date of Patent: *Mar. 14, 2000

[54] ROTATING LASER SCANNER HEAD WITH TARGET MOUNTED THEREIN AND SYSTEM AND METHOD FOR USE THEREWITH

[75] Inventor: Martin R. Hamar, Wilton, Conn.

[73] Assignee: Hamar Laser Instruments, Inc., Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 09/074,856

[22] Filed: May 8, 1998

Related U.S. Application Data

[60] Provisional application No. 60/045,958, May 8, 1997.

[51] Int. Cl.$^7$ .................................................. G02B 26/08
[52] U.S. Cl. ...................... 359/196; 359/211; 356/247; 356/358
[58] Field of Search .................................... 359/196, 209, 359/211, 212, 216, 220; 356/247, 358

[56] References Cited

U.S. PATENT DOCUMENTS

| | | | |
|---|---|---|---|
| 4,593,967 | 6/1986 | Haugen | 359/18 |
| 5,307,368 | 4/1994 | Hamar | 372/107 |
| 5,610,711 | 3/1997 | Rando | 356/247 |

*Primary Examiner*—Darren E. Schuberg
*Attorney, Agent, or Firm*—Anthony J. Casella; Gerald E. Hespos

[57] ABSTRACT

A laser generator is provided having a rotating scanner head within which a target is mounted. The target is a position sensitive cell which is used to buck the laser generator into a pre-determined reference plane. The laser generator is used in conjunction with passive reflectors which do not need any circuitry to be operated. In operation, the laser generator scans a generated laser beam to define a laser plane. The reflectors are disposed to define the reference plane. As the generated laser beam impinges upon a reflector, the laser is re-directed back to the scanning head where it impinges upon the target. The impingement upon the target indicates the relative position and angular orientation relative to the reflector. In response to acquired data, the position and angular orientation of the laser generator may be adjusted to be aligned with all of the reflectors, resulting in the scanned laser plane being bucked into the reference plane.

8 Claims, 2 Drawing Sheets

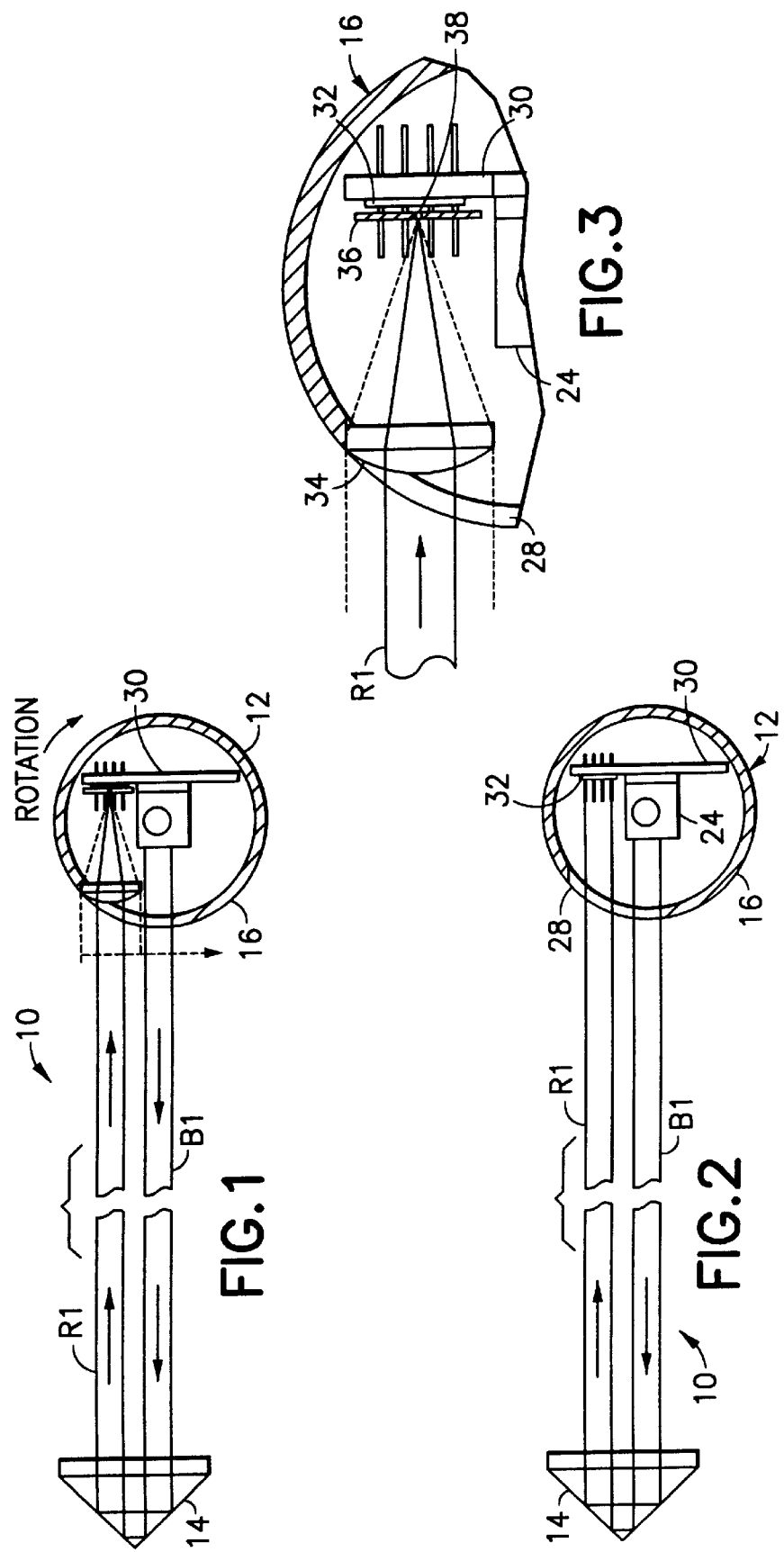

6,038,050

ROTATING LASER SCANNER HEAD WITH TARGET MOUNTED THEREIN AND SYSTEM AND METHOD FOR USE THEREWITH

This application claims the benefit of Provisional Application Ser. No. 60/045,958 filed May 8, 1997.

BACKGROUND OF THE INVENTION

Rotating laser scanners for generating reference laser planes are known in the prior art. Typically, the laser scanner generates a laser plane which is bucked into three fixed reference targets. To achieve proper bucking in of the generated laser plane with the fixed reference targets, the reference targets are provided with readouts and infrared data links that transmit target readings back to the laser scanner. The laser scanner itself is computer controlled and, in accordance with the transmitted target readings, acquires the targets, figures out the respective locations of the targets relative to the laser scanner, and then self-adjusts in pitch, roll and elevation so that a generated laser plane is aligned with the centers of the three reference targets. However, simultaneous use of two or three of these systems in the same general locality would result in severe communications problems. The simultaneous transmission of data from the target data links to the respective laser scanners creates "collisions" among the various transmissions and, consequently, the transmissions are muddled. If a relatively few number of systems are utilized, on the order of two or three, software modifications can avoid such communications problems. However, the use of a greater number of systems creates further communications problems. Alternatively, if infrared data links were not used and cables were used in their stead, the communications problems described above would disappear, but then there would be a multitude of cables that would have to be strung and restowed at the end of each working day and would be subject to wear and tear, etc. Furthermore, each target unit has three components that must be interconnected, with attendant reliability and communications problems.

It is an object of the subject invention to provide a self-aligning laser generating apparatus which requires only a single position-sensitive target to achieve proper alignment.

It is also an object of the subject invention to provide a system for achieving self-alignment of a laser generating apparatus.

It is further an object of the subject invention to provide a method by which a laser generator may be self-aligned.

SUMMARY OF THE INVENTION

The aforementioned objects are met by a system comprising a laser plane generator formed with a scan head containing both a pentaprism and a target. The target is a position sensitive cell. At least one retroreflector, or else a "cat's eye", a roof prism, or a flat mirror, is used with the laser generator of the subject invention, which passively folds the generated beam back directly upon itself. At least three retroreflectors must be used to define a reference plane. By using a single target mounted in the scan head to read each of three retroreflectors, all of the prior art communications interaction difficulties are totally eliminated.

Three retroreflectors may be fixed to define a reference plane. The laser generator of the subject invention is bucked into the reference plane using the following method. The scan head of the laser generator is caused to rotate, with the pentaprism redirecting a laser beam generated by the laser generator 90° and generating a laser scan plane. As the generated redirected beam is scanned, the beam is directed to generally coincide with each of the retroreflectors. As the beam passes over each of the retroreflectors, each retroreflector causes the beam to be redirected in the opposite direction towards the scan head along a path generally parallel to the path the laser beam traveled to the respective retroreflector. With the beam returning to the scan head, the return beam coincides with the target mounted in the scan head. The target is a position sensitive cell which acquires location data of the laser generator relative to the respective retroreflector, and the location data can be transmitted to a computer, or other control means known by those skilled in the art, which can accordingly adjust the position and/or angular orientation of the laser generator. The laser generator can be eventually located to generate a laser scan plane which is formed to pass through the center of each of the retroreflectors and allow the laser generator to be bucked into the reference plane defined thereby.

Additionally, a cylindrical lens may be provided to concentrate the return laser beam on the target. The use of the cylindrical lens effectively "widens" the width of the target. This is significant in that the reference beam is effectively being read at twice the distance of a prior art one-way system (because the beam goes out to the target and then returns) and, by optically "widening" the cell, the return beam is effectively slowed down. Stated differently, the use of the retroreflectors doubles the speed of the beam across the target, but using the cylindrical lens slows the beam down so that the target can still accurately read the beam position.

An additional benefit from the use of the cylindrical lens is the fact that a field stop in the form of a slit could be placed directly in front of the target cell. Such a field slit would limit the field of view in a horizontal direction of the target and lens combination. This is extremely desirable because it eliminates a considerable amount of background light. Background light degrades performance of the target and is highly undesirable. The field slit could be formed to reduce the target's field of view to less than one degree, thereby substantially reducing the amount of background light the target is exposed to.

In summary, the invention includes a laser scan head utilizing a pentaprism, a position sensitive cell mounted in the laser scan head and a retroreflector target. In an alternative embodiment, the scan head includes a cylindrical lens and a field stop to limit exposure of background light to the position sensitive cell.

These and other features of the invention will be better understood through a study of the following detailed description and accompanying drawings.

BRIEF DESCRIPTION OF THE DRAWINGS

FIG. 1 is a schematic of an embodiment of the system of the subject invention.

FIG. 2 is a schematic of the preferred embodiment of the system of the subject invention.

FIG. 3 is an enlarged partial view of a portion of the scan head of the subject invention.

DETAILED DESCRIPTION OF THE INVENTION

Figure 4:
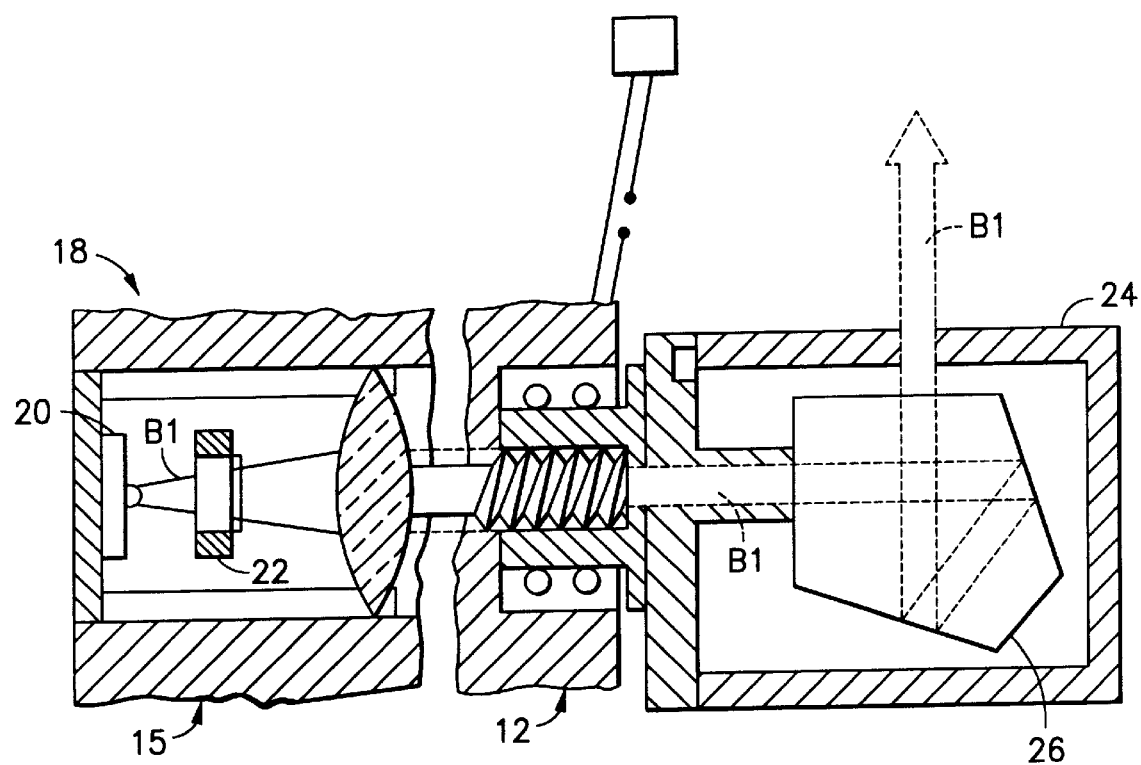
FIG. 4 is a schematic of a laser generator which may be used with the subject invention.

Referring generally to FIGS. 1 and 2, a system 10 is provided for bucking in a laser generator 12 into a reference plane (not shown) defined by at least three retroreflectors 14. The system 10 can be used for alignment or measuring. Any passive reflector, such as a cat's eye, roof prism or flat mirror, formed to re-direct a laser beam 180° in an opposite direction, as described below, may also be used. The laser generator 12 is formed to generate a laser scan plane, using a rotating scan head 16. With the exception of the construction of the scan head 16, the laser generator 12 is disclosed in U.S. Pat. No. 5,307,368. The disclosure of U.S. Pat. No. 5,307,368 is incorporated by reference herein. Although the discussion below is limited to the generation of a single laser scan plane, the invention of U.S. Pat. No. 5,307,368 may be used with the system 10 to simultaneously buck the laser generator 12 into a plurality of mutually perpendicular planes.

Referring to FIG. 4, the laser generator 12 is shown which includes a laser 18 housed within a main body 15. The laser 18 includes a laser emitting diode 20 which is formed to generate a laser beam B1 through a tilt plate 22 which is mounted in the laser generator 12 to allow for adjustment of pitch and yaw of the beam B1 relative to the laser generator 12. The laser beam B1 is directed into a scanner 24, rotatably mounted to the laser generator 12, which includes a pentaprism 26. The pentaprism 26 is formed to redirect the laser beam B1 in a substantially perpendicular direction exiting the pentaprism which is substantially perpendicular to the direction of entry of the laser beam B1 into the pentaprism 26. The scanner 24 is formed to be rotatably driven so that a generated laser beam B1 is projected 360 degrees about the axis of rotation of the scanner 24, thereby generating a laser scan plane.

Referring to FIGS. 1 and 2, the laser scan head 16 is mounted to the laser generator 12 about the scanner 24 to rotate therewith. An aperture 28 is formed in the scan head 16 to allow the generated laser beam B1 to pass therethrough. A plate 30 is mounted to the scanner 24 opposite the exit port of the laser beam B1, and a target 32 is securely mounted thereto. Although the target 32 is only shown as being located to one side of the scanner 24, the target 32 can be located on either side, above or below the scanner 24. Also, more than one target 32 may be used which are located about the scanner 24 wherein position location data is obtained by averaging data obtained by each of the respective targets 32. The target 32 is a position sensitive cell, which is preferably a single axis cell or CCD, or, alternatively, a dual-axis cell. More preferably, the cell has a vertically aligned single-pixel column defining the cell's sensitive region. With such a slender sensitive region, the target 32 inherently defines a field stop when used with a lens which limits exposure of the target 32 to background light.

In an alternative embodiment, a cylindrical lens 34 is axially spaced from the target 32 and mounted to the scan head 16. Also, in the alternative embodiment, a field stop 36 is disposed between the cylindrical lens 34 and the target 32. The field stop 36 is axially aligned with the target 32 and is preferably located to be adjacent the target 32. A slit 38 is centrally formed in the field stop 36 to allow a return laser beam, described below, to pass through the field stop 36 and coincide with the target 32. With the combination of the cylindrical lens 34 and the field stop 36, a "wider" (more than one-pixel wide) cell can be used for the target 32. It is, however, preferred that a "slender" cell be used for the target 32, and no cylindrical lens 34 or field stop 36 be included in the scan head 16.

In operation, the laser generator 12 emits a generated laser beam B1, which defines a laser scan plane as the scanner 24 and the scan head 16 simultaneously rotate. As the laser beam B1 coincides with one of the retroreflectors 14, the respective retroreflector 14 causes the laser beam B1 to be redirected in the opposite direction, as shown in FIGS. 1 and 2. The redirected laser beam B1 travels back towards the scan head 16 as return beam R1 along a path which is substantially parallel to the path of laser beam B1. The return beam R1 passes through the aperture 28 and, in the alternative embodiment, through the cylindrical lens 34. As shown in FIG. 3, the cylindrical lens 34 causes the beam R1 to converge on the target 32. The converged beam R1 will coincide with the target 32 along a vertical line. Due to the convergence of the beam R1 by the cylindrical lens 34, only a limited portion of the target 32 needs to be exposed by the field stop 36. Accordingly, the slit 38 may be relatively narrow to limit the horizontal field of view the target 32 is exposed to. Consequently, the more limited the horizontal field of view the target 32 is exposed to, the less background light is also exposed to the target 32. Using the combination of the cylindrical lens 34 and the slit 38 formed in the field stop 36, the field of view exposed to the target 32 may be limited below an angle of one degree, thereby enhancing performance of the system 10. In the preferred embodiment, the return beam R1 directly impinges upon the target 32. Due to the slender dimensions of the cell of the target 32, the field of view exposed to the target 32 is inherently limited.

Data obtained by the target 32 may be used to adjust the location of the laser generator 12 relative to individually each of the retroreflectors, 14, as well as the angular orientation thereof. Specifically, the location of the impingement of the return beam R1 on the target 32 indicates the relative position and angular orientation of the laser generator 12 with respect to the retroreflectors 14. For the laser generator 12 to be bucked into one of the retroreflectors, 14, the laser beam B1 must impinge a pre-determined point on the retroreflector 14 with the laser beam B1 being properly angularly oriented relative thereto. The target 32 is preferably disposed so that the return beam R1 will impinge the center of the target 32 with the laser generator 12 being bucked into the retroreflector 14. Any misalignment of the point of impingement of the return beam R1 on the target 32 is indicative of the laser generator 12 not being bucked into the retroreflector 14. Iterative adjustments of the position and angular orientation of the laser generator 12 can be made based on the data generated by the target 32 to achieve bucking in.

As is readily appreciated, the system 10 may be used for alignment and/or measurement. The coplanarity and location of an object can be evaluated relative to the reference plane defined by the retroreflectors 14. To this end, an additional retroreflector 14 is mounted to the object. Also, the elevation (distance measured along a straight line perpendicular to the reference plane) of the object can also be evaluated by bucking in the laser generator 12 with the retroreflector 14 mounted on the object and determining change in position and/or angular orientation of the laser generator 12 from the reference plane.

The invention advantageously allows for the laser generator 12 to be adjusted relative to the retroreflectors 14, or, alternatively, the invention may act as a collimator with the laser generator 12 being held in a fixed position and fixed angular orientation and the retroreflectors 14 being moved relative to any generated beam.

Further, the laser generator 12 can be caused to generate simultaneously a plurality of mutually perpendicular laser planes and be bucked into a two or three coordinate-axis system. To achieve this result, five or six, respectively, retroreflectors 14 must be disposed to define the axes in space. With five retroreflectors 14, the laser generator 12 can be located and oriented in space relative to two coordinate axes and three coordinate angles (e.g. located at specific x and y coordinates and specific yaw, pitch and roll angles). With a sixth retroreflector 14, the laser generator 12 can be located and oriented in space relative to three coordinate axes and three coordinate angles (e.g. located at specific x, y and z coordinates and specific yaw, pitch and roll angles).

As is readily apparent, numerous modifications and changes may readily occur to those skilled in the art, and hence it is not desired to limit the invention to the exact construction and operation, as shown and described, and accordingly all suitable modification equivalents may be resorted to falling within the scope of the invention as claimed.

I claim:

1. A system for aligning a generated laser beam relative to a pre-defined reference point, said system comprising:
   a laser generator including:
      a housing having a main body and a scan head rotatably mounted to said main body, said scan head having an exit port therein to allow the generated laser beam to pass therethrough;
      means for generating the laser beam fixedly disposed in said main body, said means for generating the laser beam being aligned to direct the laser beam into said scan head;
      scanner means for re-directing the direction of the laser beam disposed in said scan head;
      a plate securely mounted to said scanner means, said plate being disposed in said scan head opposite said exit port;
      at least one slender position sensitive cell securely mounted on said plate adjacent said scanner means, said slender position sensitive cell being disposed opposite said exit port; and
   a reflector formed to be impinged upon by the laser beam and to passively reflect the laser beam in beam form, wherein said reflector defines the reference point, and wherein the laser beam is emitted from said laser generator through said exit port to impinge upon said reflector, said reflector passively reflects the laser beam in beam form as a return laser beam, said return laser beam impinges upon said slender position sensitive cell, whereby the relative position and angular orientation of said laser beam with respect to said reference point is collected by said slender position sensitive cell to align said laser beam to said reference point.

2. A system for aligning a generated laser beam relative to a pre-defined reference point as in claim 1 further comprising a cylindrical lens axially aligned with said slender position sensitive cell and said port.

3. A system for aligning a generated laser beam relative to a pre-defined reference point as in claim 2 further comprising a field stop disposed between and axially aligned with said cylindrical lens and said slender position sensitive cell.

4. A system for bucking a scanned laser plane into a pre-defined reference plane, said system comprising:
   a laser generator including:
      a housing having a main body and a scan head rotatably mounted to said main body, said scan head having an exit port therein to allow the generated laser beam to pass therethrough;
   means for generating the laser beam fixedly disposed in said main body, said means for generating the laser beam being aligned to direct the laser beam into said scan head;
   scanner means for re-directing the direction of the laser beam disposed in said scan head and for scanning the laser beam to define the reference plane;
   a plate securely mounted to said scanner means, said plate being disposed in said scan head opposite said exit port;
   at least one slender position sensitive cell securely mounted on said plate adjacent said scanner means, said slender position sensitive cell being disposed opposite said exit port; and
   at least three reflectors spaced from said laser generator disposed to define the reference plane, each said reflector being formed to be impinged upon by the laser beam and to passively reflect the laser beam in beam form, wherein said laser generator being adjustably mounted such that position and angular orientation of said laser generator are both adjustable.

5. A system as in claim 4, wherein at least one said reflector is a retroreflector.

6. A system as in claim 4, wherein at least one said reflector is a cat's eye.

7. A system as in claim 4, wherein at least one said reflector is a roof prism.

8. A system as in claim 4, wherein at least one said reflector is a mirror.

* * * * *